United States Patent
Darling

(10) Patent No.: US 8,359,540 B2
(45) Date of Patent: Jan. 22, 2013

(54) APPARATUS, METHODS, AND ARTICLES OF MANUFACTURE FOR CONSTRUCTING AND MAINTAINING A CALENDARING INTERFACE

(75) Inventor: Anne Marie Darling, Jersey City, NJ (US)

(73) Assignee: Goldman, Sachs & Co., New York, NY (US)

( * ) Notice: Subject to any disclaimer, the term of this patent is extended or adjusted under 35 U.S.C. 154(b) by 1429 days.

(21) Appl. No.: 10/267,954

(22) Filed: Oct. 9, 2002

(65) Prior Publication Data

US 2004/0073615 A1  Apr. 15, 2004

(51) Int. Cl.
*G06F 3/00* (2006.01)
*G06F 17/30* (2006.01)
(52) U.S. Cl. ......... 715/751; 715/963; 715/753; 707/769
(58) Field of Classification Search .................. 715/963, 715/751, 753; 709/206; 705/8, 9; 707/769
See application file for complete search history.

(56) References Cited

U.S. PATENT DOCUMENTS

| | | | | |
|---|---|---|---|---|
| 5,355,181 | A  * | 10/1994 | Ashizaki et al. | 348/744 |
| 5,491,797 | A  * | 2/1996  | Thompson et al. | 709/204 |
| 5,898,431 | A  * | 4/1999  | Webster et al. | 715/841 |
| 5,960,406 | A  * | 9/1999  | Rasansky et al. | 705/9 |
| 6,016,478 | A  * | 1/2000  | Zhang et al. | 705/9 |
| 6,263,358 | B1 * | 7/2001  | Lee et al. | 718/100 |
| 6,278,456 | B1 * | 8/2001  | Wang et al. | 715/700 |
| 6,369,840 | B1 * | 4/2002  | Barnett et al. | 715/853 |
| 6,594,637 | B1 * | 7/2003  | Furukawa et al. | 705/9 |
| 6,684,212 | B1 * | 1/2004  | Day et al. | 707/10 |
| 6,732,080 | B1 * | 5/2004  | Blants | 705/9 |
| 2002/0016729 | A1 * | 2/2002 | Breitenbach et al. | 705/9 |
| 2002/0156787 | A1 * | 10/2002 | Jameson et al. | 707/10 |
| 2004/0039630 | A1 * | 2/2004 | Begole et al. | 705/11 |

* cited by examiner

Primary Examiner — Tadeese Hailu
(74) Attorney, Agent, or Firm — Perkins Coie LLP

(57) ABSTRACT

Systems, methods, apparatus, and means for managing an event are provided including creating an event, causing event information to be transmitted to a first group of internal users for communication to a plurality of external users, receiving requests for attendance, creating a final event schedule, causing confirmation information to be transmitted, and generating event summary reports upon completion of said event.

29 Claims, 12 Drawing Sheets

Analyst Call: Joan Woodward w/Artisan Partners
Date(s): Thursday, May. 2, 2002

Registration: Monday, May. 13, 2002 (Open)

Last Updated:                                 Security Access:
May 13, 2002 - 11:52 AM EST                   All GS Employees
Pamela Dee Harpaz

Meeting Information:

Washington, DC - Monday, May. 13, 2002

Times: 3:00 PM - 4:00 PM EST
  Location: Goldman Sachs, 9th Floor, Washington, DC
  RSVP Contact(s): Denisa Ballard                 +1 (212) 902 2817
  Res. Analyst(s): Joan Woodward                  1 (202) 637-3757

Institutional Attendee(s): (2)

Artisan Partners (2)
  Andy Stephens                                   +1 (414) 390 8307
  Matt Wolfersberger                              +1 (414) 390 8220

APPARATUS, METHODS, AND ARTICLES OF MANUFACTURE FOR CONSTRUCTING AND MAINTAINING A CALENDARING INTERFACE

FIELD OF THE INVENTION

Embodiments of the present invention relate to apparatus, methods and articles of manufacture for constructing and maintaining a calendaring interface. More specifically, embodiments of the present invention relate to apparatus, methods, and articles of manufacture for constructing and maintaining a calendaring interface throughout an enterprise, including database links, calendaring events, and messaging.

COPYRIGHT RIGHTS

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

Scheduling or "calendaring" multiple events, e.g., meetings, conference calls, etc., across an enterprise may be an extremely challenging task. For example, in the financial industry, events may be internally generated, i.e., arise from inside the enterprise. Internal events might include, for example, meetings about a particular industry, conference calls about a particular stock, etc. Events might also be externally generated, for example, Treasury Department announcements such as production numbers, corporate quarterly earnings reviews, etc.

Presently, multiple calendaring applications are frequently used in corporate environments. Unfortunately, some or all of these applications may be incompatible, thus forcing the user to manually update the applications, clear conflicts, etc. It would be desirable to provide a calendaring application which avoids unnecessary manual updates or coordination among different calendaring applications. It would also be desirable to provide an enterprise-wide calendar in addition to individual calendars, allowing enterprises to track, update, and schedule a number of different types of events and activities.

In certain industries, calendaring technology takes on added complexity because of security, privacy and confidentiality requirements. For example, in the financial industry, not all users may be authorized to view all or even most events. Therefore, effective calendaring technology must implement proper security levels for event information access. Moreover, security regulations may require appropriate review of content before dissemination, as well as observance of appropriate regulations for dissemination. Thus single point of entry calendaring would be desirable to assist in proper security measures and maintain data integrity.

Additionally, it may be necessary to notify external users, such as clients, of certain events. Effective calendaring technology must properly interface with external users while always obeying various security requirements. For example, some external clients may be invited to a number of events, as they are high-priority clients of the enterprise. Others may have lesser priority levels. These levels must be taken into account by the calendaring technology. It would be desirable if user entitlement technology could be used, for example, to automatically implement appropriate priority levels.

Additionally, the use of filtering technology would be desirable as well. The customization afforded by filter technology could provide users with desired views and data. Predetermined or preformatted views would be helpful as well as they would desirably provide the user with automatically implemented data. For example, predetermined views offering daily, weekly or monthly views would provide the user with simple methods of receiving the appropriate data.

Calendaring technology should also interface with other information resources. For example, it would be beneficial if links to research and other databases were implemented so that a user could "drill down" into any research or other information about an event or the topic of an event.

Calendaring technology should also desirably capture and report on data, by implementing data capture of user interactions, user trends, and any other desired information. Data capture and reporting could be extremely useful to determine marketing and sales targeting, refine product offerings, resource allocations, etc.

Accordingly, it is an object of the present invention to provide apparatus, methods and articles of manufacture for constructing and maintaining a single source calendaring interface.

It is a further object of the present invention to provide apparatus, methods and articles of manufacture for constructing and maintaining a single source calendaring interface with streamlined input.

It is a further object of the present invention to provide apparatus, methods and articles of manufacture for constructing and maintaining a single source calendaring interface with security features.

It is a further object of the present invention to provide apparatus, methods and articles of manufacture for constructing and maintaining a single source calendaring interface with user entitlement features.

It is a further object of the present invention to provide apparatus, methods and articles of manufacture for constructing and maintaining a single source calendaring interface with filtering features.

It is a further object of the present invention to provide apparatus, methods and articles of manufacture for constructing and maintaining a single source calendaring interface with interfaces to existing calendaring and scheduling applications as well as other data sources.

SUMMARY OF THE INVENTION

Embodiments of the present invention provide apparatus, methods, articles of manufacture, and means for constructing and maintaining a single source calendaring interface. In some embodiments, an n-tier client server architecture is used to obtain and store data about calendared items (referred to generally as "Events" and "SubEvents"). In some embodiments, users may create and monitor Events, register themselves and clients for events, notify others of Events, obtain information about Events, and report on Events. In some embodiments, users are provided with the ability to filter data, by use of predetermined views, which provide only predetermined data (such as daily, weekly or monthly data) and/or customizable filters, which provide data falling within certain parameters selected by the user. In some embodiments, such as in an enterprise-wide implementation, security protocols are implemented to ensure proper user entitlement. Additionally, standardization of data assures consistent results.

In some embodiments, event registration is simplified. An internal user, for example, may be a sales person at the enterprise. She is able to access events that have been entered and may be of interest to her clients. For example, if her client is a hedge fund manager, the sales person may view, at a glance, all events occurring in the next month that may be of interest to her clients. Events may be created by an appropriately entitled internal user. Events may also be imported from a data source. In some embodiments, through email or other notification, the user may offer to register the client for certain events, and a streamlined registration process provides the user with the ability to quickly view available times, register the client, and perform other desired functions.

BRIEF DESCRIPTION OF THE DRAWINGS

FIGS. 4a-h show further user interfaces for display on a user device of some embodiments of the present invention.

DETAILED DESCRIPTION

Figure 1:
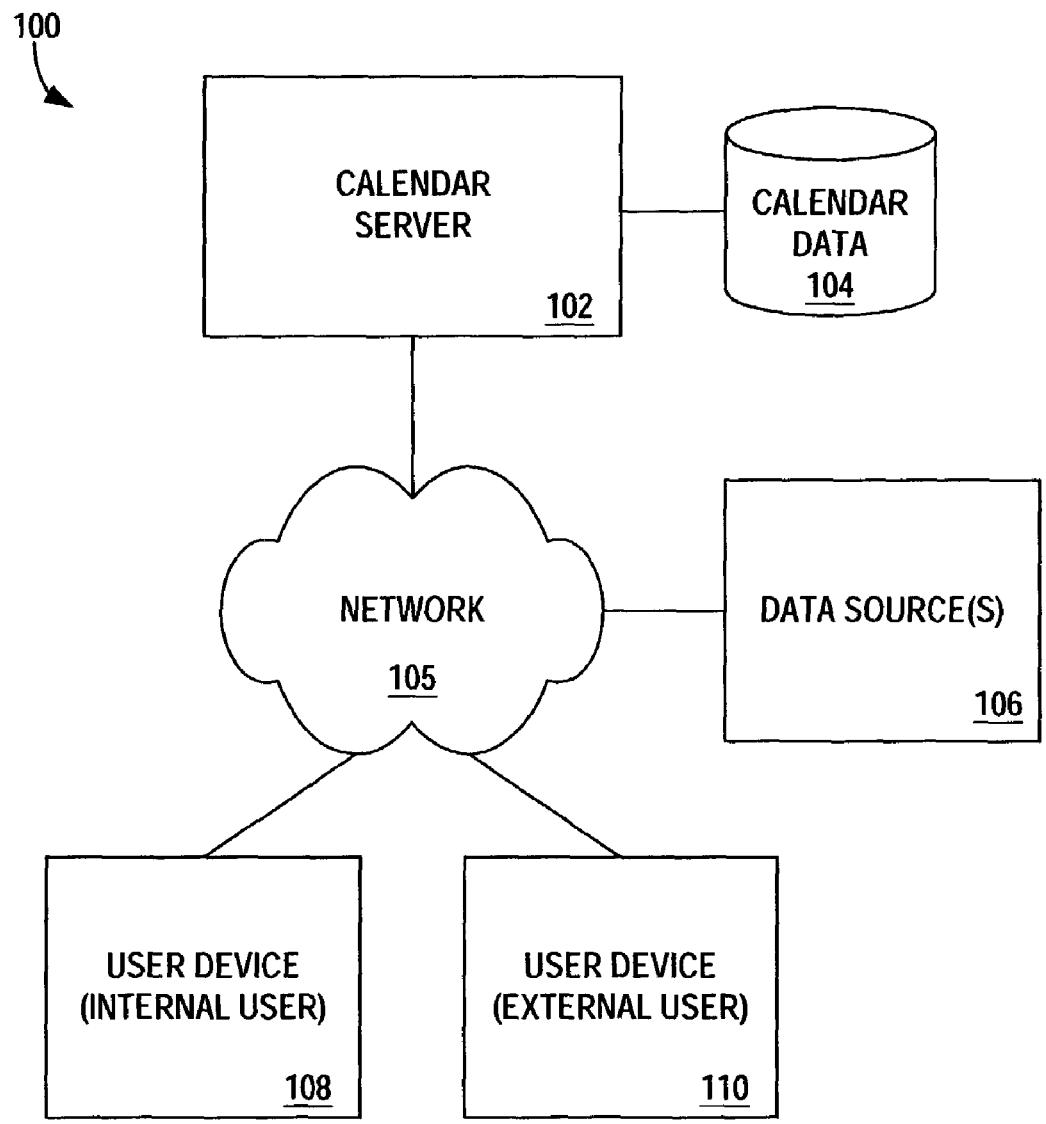
FIG. 1 shows a schematic view of one embodiment of a system suitable for implementing features of the present invention.

Embodiments of the present invention provide apparatus, methods, articles of manufacture, and means for constructing and maintaining a single source calendaring interface.

Applicant has recognized that the use of a single source calendaring system for enterprise users (including "internal" and "external" users) should contain a number of attributes. For example, Applicant has developed an enterprise wide calendar that interacts with individual calendars. This provides the maximum flexibility and information flow. Moreover, the users are provided with filter and view capabilities, so she may find and view only those events of interest. Pursuant to some embodiments, filter and view capabilities are simplified, so that, for example, upon log in a user may be taken to their preferred views.

Applicant has developed a system in which event creation and information input is streamlined, allowing automated input of both external and internal events into an individual as well as enterprise-wide calendar. Automating event input frees individuals from the sometimes tedious task of inputting events.

Applicant has further developed a system in which standardized event input is provided, avoiding confusion between different formatting dates, times, event titles, duplicate events, etc. Standardized input permits rapid input for those events that cannot be automated. For example, embodiments streamline the user interaction so that only a few actions are necessary to schedule events. Moreover, streamlining event entry eases the scheduling challenge when repeating events are scheduled, by minimizing any actions needed to enter duplicate information.

In some embodiments, standardized output are also provided. Standardized output assists understanding and minimizes confusion as well. Moreover, standardized output include event output, such as an appropriate calendar, as well as reporting output, such as event feedback.

In some embodiments, the calendaring interface may be operated by an entity such as a financial services institution to provide a unified calendar for employees of the entity ("internal users" or "users") as well as clients or other customers of the entity ("clients"). In some embodiments, the primary users of the calendaring interface are the internal users, who may interact with the calendaring system to perform calendaring actions. For example, the internal users may be provided with the ability to create new events, schedule occurrences of events, and monitor the occurrence of events.

As an example, sales people employed by a financial services company often have a responsibility to monitor a number of events of interest to themselves and their clients. Using an embodiment of the present invention, such sales representatives may monitor a number of different events, notify their clients of particular events of interest to their clients, schedule clients for participation in particular activities (also referred to herein as "subevents"), etc. through a convenient and unified graphical interface. In some embodiments, a number of "events" are associated with a number of subevents or "meetings". For example, when a new event is created using system 100, the type of event is identified and a number of subevents may be automatically associated with the new event. As a particular example, a financial services company may establish several types of event and subevent hierarchies, including, for example: (1) an analyst research marketing day (the "event") having a number of corresponding meetings associated with it, including one or more conference calls, one or more group meetings, one or more "1×1" or one-on-one face offs with an analyst, one or more presentations, and one or more breaks (each a "subevent" tied to the "event"); (2) an analyst pre-marketing day (the "event") having a number of corresponding meetings associated with it, including one or more conference calls, group meetings, "1×1's", and breaks (again, each a "subevent" tied to the "event"); (3) a conference (the "event"), having a number of corresponding meetings associated with it, including one or more conference calls, group meetings, "1×1s", teach ins (or lectures), breaks, breakouts, recreation activities, receptions, and presentations (each a "subevent" tied to the "event"); etc.

By utilizing this event/subevent hierarchy, applicant has discovered that complex events and meetings involving a number of internal and external participants may be more efficiently and readily created, scheduled, managed and executed. For example, security and access privileges may be established for an event and automatically disseminated through the hierarchy (e.g., if an analyst research marketing day is created as an event, and if only particular types of external users may attend, those same privileges may be automatically disseminated to each of the subevents associated with the event, ensuring that only users who may attend the subevents will be notified of those events). Further, by utilizing a hierarchical relationship between events and subevents, event creation is simplified. To create an event, a user interacts with a calendaring system such as system 100 of FIG. 1 to select an event type, and then the user is presented with a selection of available subevents that are typically associated with such an event. The user may then pick and choose and provide details for each of the subevents to be associated with the newly created event. Other features and advantages will be described further below.

Features of some embodiments of the present invention will now be described by first referring to FIG. 1, which depicts a system 100 including a calendar server 102 in communication with one or more calendar data sources 104.

Calendar server 102 is in communication with one or more data source(s) 106 and one or more user devices 108, 110 (including both internal users and external users). In one example embodiment, system 100 is operated by, or on behalf of, an entity such as a financial services company which has a need to establish, track, manipulate information about a wide variety of events and subevents.

In some embodiments, calendar server 102 is any computing device which is capable of performing the various functions described herein. For example, in some embodiments, calendar server 102 may be configured as a Web server adapted to exchange information with data sources (e.g., such as calendar data 104 and data source(s) 106) as well as with a plurality of user devices (e.g., including user devices operated by internal and external users).

In general, each of the devices of system 100 may be formed of components or other devices capable of performing the various functions described herein. For example, a user device 108, 110 may be a computing device such as a Personal Computer (PC), a laptop, a telephone, a personal digital assistant (PDA) or other device associated with a user.

As used herein, devices (e.g., calendar server 102, user devices 108, 110, data source(s) 106, and calendar data 104) may communicate, for example, via one or more communication networks such as network 105. For example, some or all of the devices may be in communication via an Internet Protocol (IP) network such as the Internet. Some or all of the devices may be in communication via other types of networks such as an intranet, a Local Area Network (LAN), a Metropolitan Area Network (MAN), a Wide Area Network (WAN), a proprietary network, a Public Switched Telephone Network (PSTN), and/or a wireless network.

According to some embodiments of the present invention, devices such as user devices 108, 110 communicate with calendar server 102 via a temporary computer communication channel (e.g., a logic path through which information can be exchanged). In other words, the communication channel between calendar server 102 and other devices may be established and discontinued as appropriate. For example, calendar system 102 may exchange information with a user device 108 via a Web site (e.g., when a browser application executing on the user device 108 is accessing the Web site to view, edit, or otherwise manipulate calendar data).

According to some embodiments, calendar server 102 communicates with other devices via a public computer communication network. That is, at least a portion of the communication network may be accessed by devices other than calendar server 102 and the other devices depicted in FIG. 1. Note, however, that the information exchanged between calendar server 102 and other devices of FIG. 1 may be encrypted or otherwise protected to prevent a third party from accessing, manipulating, understanding and/or misusing the information. Further, security techniques may be utilized to prevent certain users from accessing some, or all, calendar data.

In some embodiments, data source(s) 106 may include one or more sources of information associated with events or activities tracked by calendar server 102. For example, in an example where system 100 is operated by a financial services company, data source(s) 106 may include information associated with: clients, contacts, employees, salespeople, countries, products, corporate actions, earnings information, financial analyst biographies, pending transactions or deals, pricing information, as well as information regarding global economic events. In some embodiments, information from these data source(s) 106 may be periodically queried to pull relevant data into calendar data 104. In some embodiments, this information may be retrieved and formatted using, for example, XML stylesheets and/or database translation tools configured to convert information into a format used by calendar data 104.

In some embodiments, calendar data 104 may be a database configured to store information about events and other activities. For example (in an embodiment utilized by a financial services company) calendar data 104 may include data identifying events such as: financial analyst marketing events, roadshows or sales events, field trips, management meetings, conferences, conference calls, or the like. This information may be created, modified, viewed, and otherwise manipulated by users given appropriate access privileges (e.g., in some embodiments, external users are prevented from modifying or creating calendar data).

In some embodiments, calendar server 102 stores one or more programs or sets of data governing interaction by users operating user devices 108, 110 and data in calendar database 104. For example, calendar server 102 may include modules, programs or data governing: security (e.g., including permissions for users); filters (e.g., enforcing preferences or filters associated with particular users); lists (e.g., identifying groups, geographical areas, etc.); localization (e.g., identifying language preferences); user preferences. Further, calendar server 102 may also include modules or programs providing functions such as: reporting; search features; event management (e.g., allowing the addition, editing, or deletion of events); a calendar manager; or other functionality. Upon reading this disclosure, those skilled in the art will recognize that other features and functionality may also be provided at calendar server 102. In some embodiments, some functions may also be performed by software stored at, or accessible to, user devices 108, 110.

Figure 5:
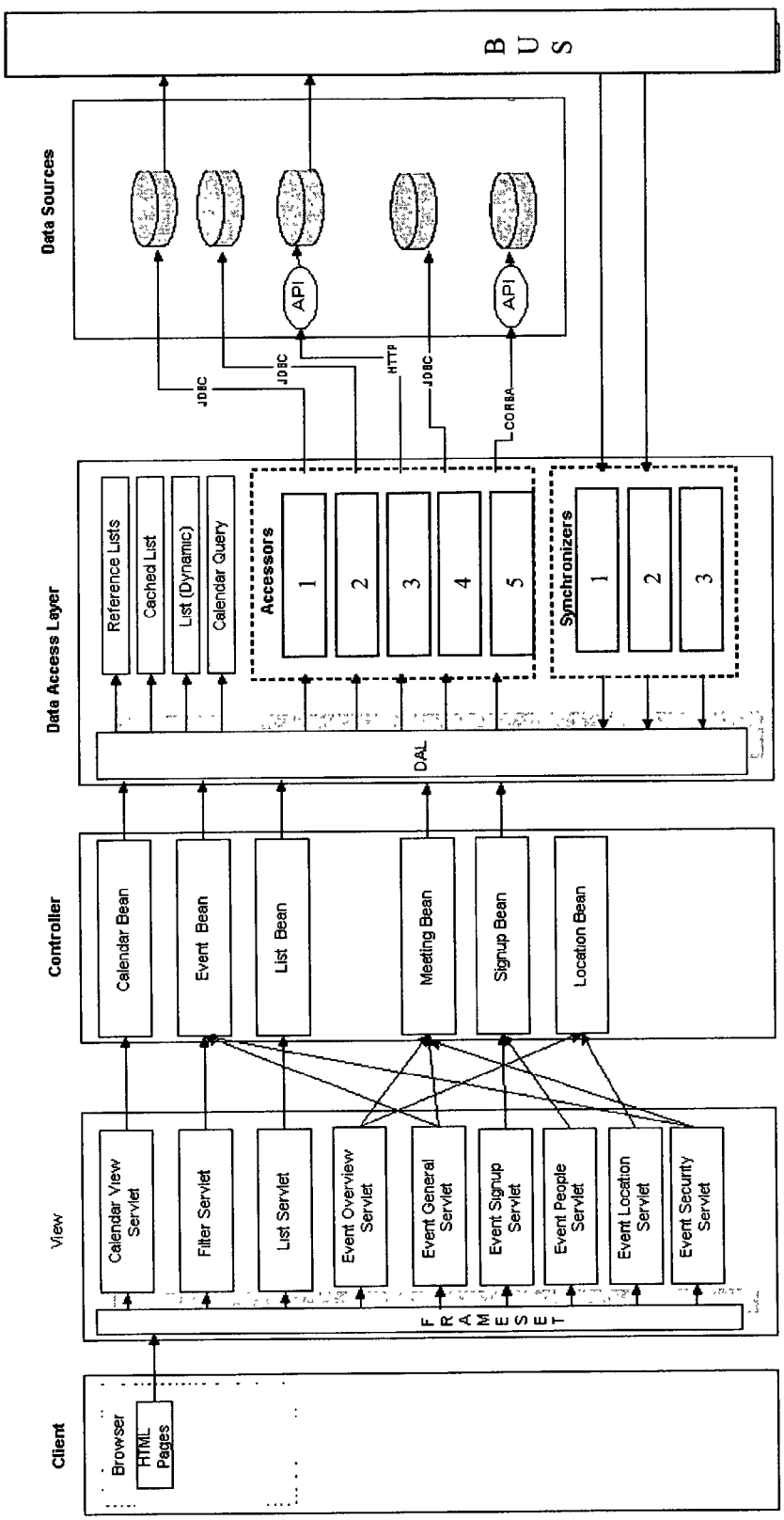
FIG. 5 shows a schematic view of portions of the system of FIG. 1 in some embodiments.

Referring now to FIG. 5, further detail of one embodiment of system 100 is depicted in which user device 108 is shown as a "client" having a browser application allowing it to access HTML pages provided by calendar server 102 (depicted as modules including a "view", a "controller" and a "data access layer"). Data sources are shown as being in communication with calendar server 102 using JDBC and CORBA protocols.

In general, FIG. 5 depicts an architectural diagram of one embodiment, which is constructed with an n-tier architecture. As depicted, the architecture comprises View components, controller components, Data Access Layer Components, internal and external Data Sources. Each of these will now be described in further detail.

In some embodiments, Java is used to construct at least some of the components. The Views are created through Java Servlets, such as Calendar View, Filter, List, Event Overview, Event General, Event Signup, Event People, Event Location, and Event Security. These Servlets provide dynamic information flow to a Webpage, necessary for viewing constantly changing information such as calendar information. The Frameset directs URL requests to the appropriate Servlets.

JavaBean classes support the Servlets in a Controller component area. These JavaBeans components comprise Calendar Bean, Event Bean, List Bean, Meeting Bean, Signup Bean and Location Bean. A Servlet may have multiple interfaces with a Controller bean, such as, for example, the Event Bean, which interfaces with and receives data objects from the Filter Servlet, Event General Servlet, and Event Security Servlet.

The Controller Beans obtain their data objects from numerous sources located within a Data Access Layer component. Located within the Data Access Layer component are the DAL interface, various List management components (Reference List, Cached List, List(Dynamic)), Accessors Components for accessing data on locally stored databases.

Accessors interface with internal and/or external databases (e.g., as described above in conjunction with FIG. 1). The databases may be populated through links to other databases in the enterprise. The interfaces may be through any methods as known in the art, for example, JDBC, HTTP, CORBA, etc.

Synchronizers may also access data through a Bus. In some embodiments, a TIBCO Bus is used to connect to external sources. Synchronizer Components may also be used to access data that is elsewhere in the enterprise. For example, Synchronizer Component 3 interfaces with a Research Data base stored elsewhere in the enterprise. Also present in the Data Access Component is a Calendar Query Component based on filter criteria.

In some embodiments, the system uses a first Netscape WebServer to provide User authentication. Requests are forwarded for processing on a second Weblogic WebServer. A second WebServer hosts the View and Controller components, as well as providing a framework for startup objects and pooling any connections to external data sources. The Data Access layer and Data Sources may be constructed as is known in the art, e.g. Sybase, etc.

Events may be created either manually or automatically. Manual input is, in some embodiments, performed by an authorized user. Automatic input is, in some embodiments, through a data feed from another resource. The event creation processes will be described further below.

Figure 2:
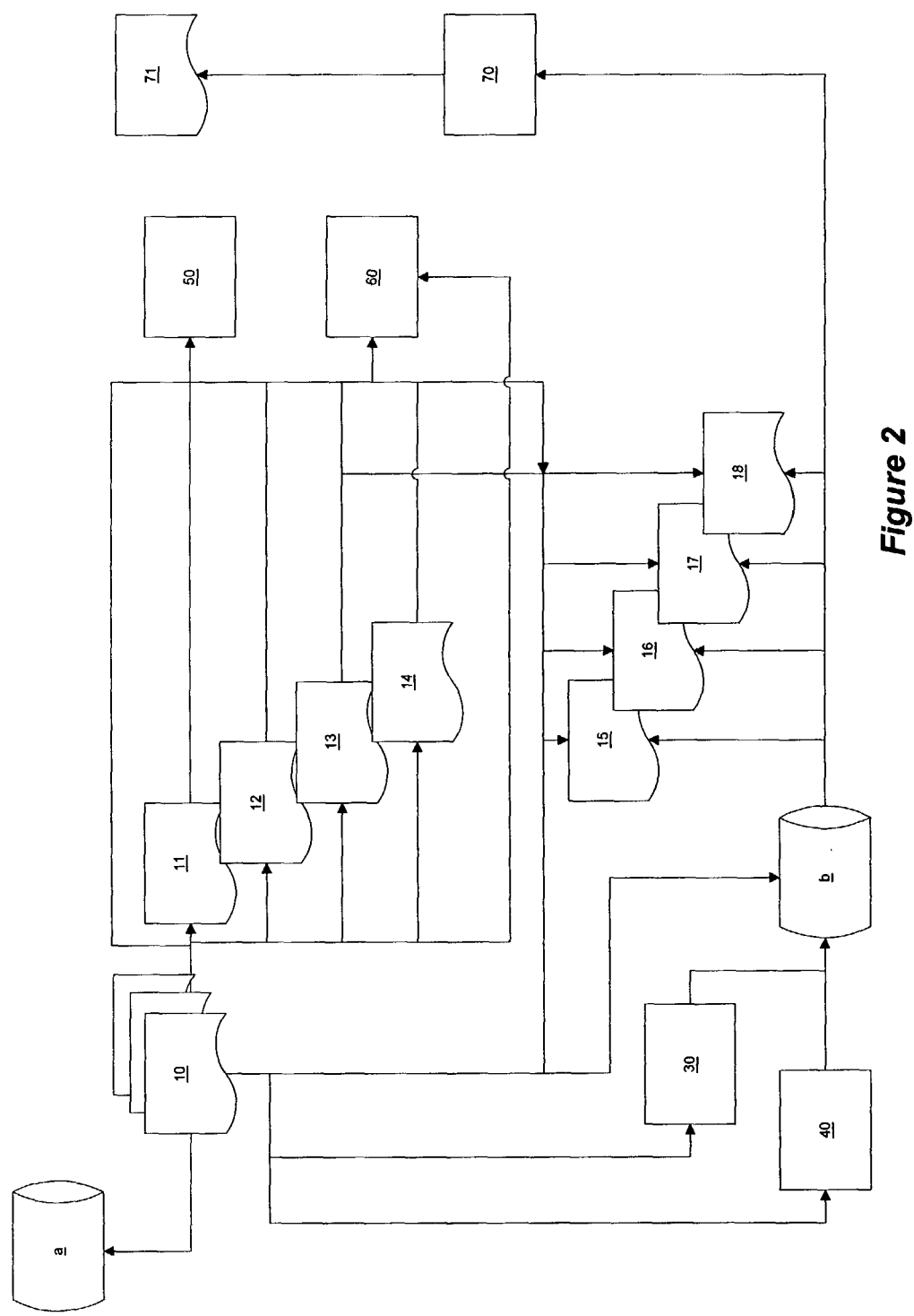
FIG. 2 shows a schematic view of selected functions of the system of FIG. 1 pursuant to some embodiments of the present invention.

Reference is now made to FIG. 2, which shows a diagrammatic view of functions of the system 100 of FIG. 1. As depicted in FIG. 2, internal users operating a user device 108 establish a set of user preferences (shown as item "a"). These user preferences are used to present a personalized Home Page 10 to the internal user after the user logs in to the calendaring system 100. The personalized Home Page 10 may be, for example, provided via a link from another Web page. Each user's Home Page(s) 10 links locally or through a server to the set of user preferences ("a") which define a particular user's particular preferences for his or her Home Page, including, if desired, a default Home Page, such as the "All" page described below with regard to some embodiments.

Each user may have one or more predefined filters (depicted as items 11, 12, 13, 14). These filters may be applied (e.g., through use of tabs or other linking mechanisms) may modify information displayed on the user's Home Page (10). The filters include various predetermined parameters, including date ranges, event types, specified industries, product lines, tickers, analyst names and locations. Thus, the user may "drill down" to view only specific events of interest. Other embodiments may include additional parameters for filters, modification of any parameters, user-created parameters, etc.

In an example embodiment utilized by a financial services company, predefined filters may include:
My Events—Events in which user is involved.
My Contacts—Events in which user's clients are involved.
Deal—Deal related events (e.g. Road Show, Analyst Pre-Marketing Day.)
Non-Deal—Non-deal related events (e.g. Conference, Field Trip.)
Analyst Marketing—Analyst Marketing related events (e.g., field trips, conference calls, etc.)
Conferences—Conference related events (including associated meetings.)
Conference Calls—Conference calls (e.g. Management, Analyst, Earnings, etc.)
Corporate Actions—Company related events (e.g. announcements, earnings, stock splits, dividends, etc.)
Economic—Economic related events (e.g. CPI, PPI, etc.)
Street Wide—Financial Industry related events.
All—All events.

When a specific event is created using embodiments of the present invention, the event is associated with one or more filters to which it is related. It should be noted that one or more events may be associated with (or made available through) one or more filters, i.e., filters are not mutually exclusive. For example, in the example relating to the financial services industry, a Non-Deal Related Conference can be retrieved from both the Conference view and the Non-Deal view.

In some embodiments users who are employees of the entity (i.e., are "internal users") may be manually or automatically assigned to particular filters and resultant views based upon various parameters, such as title, subject area, etc. For example, a New York-based stock analyst specializing in shares of U.S. companies may default to a Home Page "Week view", with a "My Events" tab, displayed in US Eastern Time with a "U.S. Shares" filter. Thus, customized filters creating customized home pages may be constructed and readily applied to particular classes of users.

Figure 3:
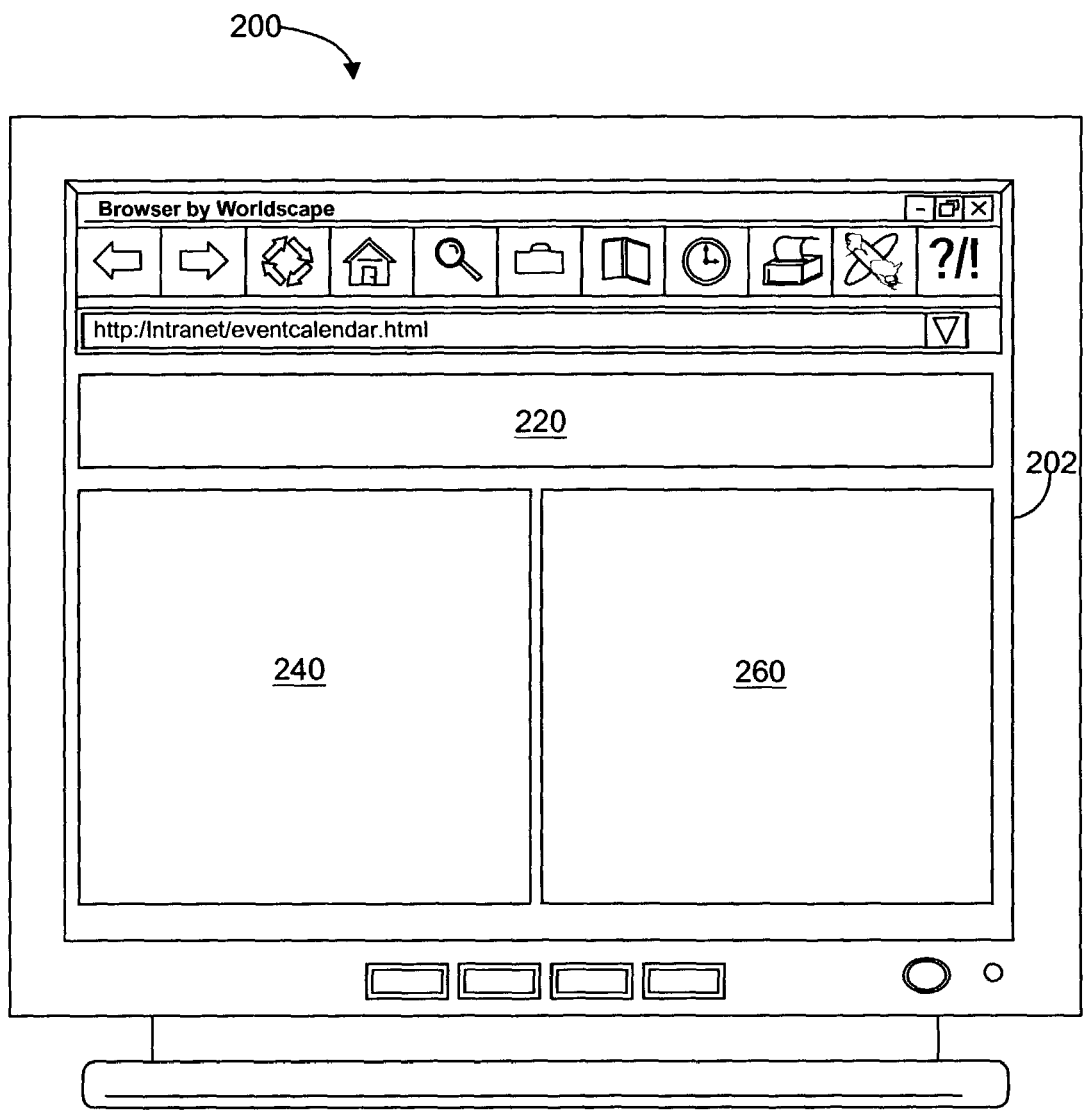
FIG. 3 shows a user interface displayed on a user device of some embodiments of the present invention.
Figure 4A:
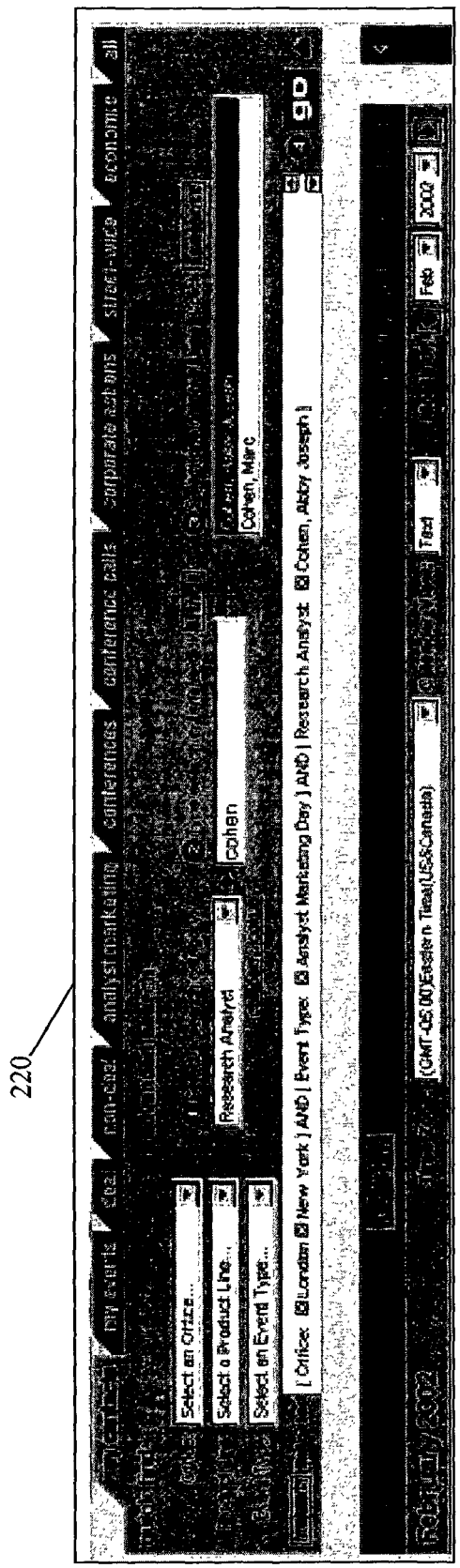

Referring to FIG. 3, an example of a users' Home Page is shown. For example, the Home Page 202 depicted in FIG. 3 may be displayed via a display device 200 to a user operating user device 108. The Home page 202 is divided into three regions, 220, 240 and 260. Region 220 contains various search criteria in this embodiment. Further details of one embodiment of region 220 are shown in FIG. 4a. As depicted in FIG. 4a, the search functions may include, for example, functionality allowing the user to search for events by using various "quick find" filters, including filtering by:
Office, which provides a search option by specific office geographic location.
Product line, which provides a search option based on a specific product line (e.g. convertibles, derivative shares, etc.)
Event type, which provides a search option based on specific event type such as conference call, meeting, etc.
Other functionality allows advanced searching capabilities. As depicted in FIG. 4a, a section titled "Advanced Search" permits a user to quickly select calendar data using various categories, such as "Clients", "Contacts", "Country", "Deal Name", "Industry", etc., as well as word searching. The search parameters are echoed on the screen for the user.

Figures 4B, 4C:
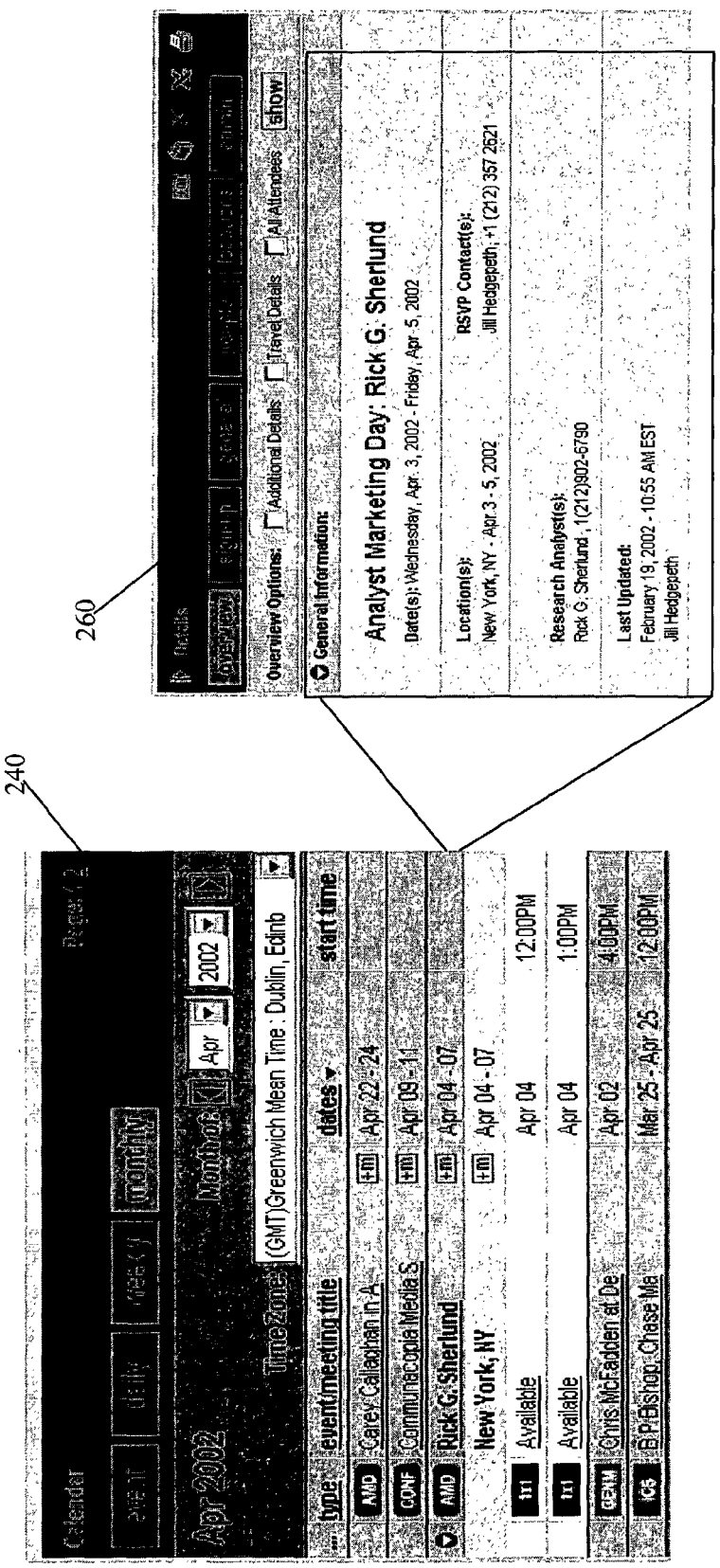

Referring again to FIG. 3, the second region (labeled region 240) is provided to contain a listing of various calendar events stored in the system. Particular details of one embodiment are depicted in FIG. 4b, showing an embodiment where region 240 can be configured as a Daily, Weekly or Monthly view. In the embodiment depicted, the user has chosen to view information in a Monthly view. Each event listed can be viewed in collapsed form or expanded form, with the latter providing all scheduled meetings (or "subevents") during the event. Various legends are used to indicate the type of event, such "Conference", "Conference Call", "Analyst Marketing Day", "Road Show", etc.

Referring again to FIG. 3, the third region (labeled as region 260) may be configured to provide the details for any particular selected event. As shown in an example screen in FIG. 4c, region 260 may be configured to provide a view of an "Event Details" screen. The screen provides a number of options for a particular event. For example, the details view is shown, with details such as date, time, location, contacts, etc. SubEvents of the Event may be displayed as well. In the example depicted, details regarding an "event" are shown (i.e., an Analyst Marketing Day). The user interface 202 displayed to a user operating a user device 108 may also be configured to provide the user with options to "sign up," or enroll for participation in, a particular selected event. In some embodiments, such a "sign up" option provides a simple method for users to enroll in an event, to enroll a client in an event, or to enroll other clients in an event (or sub event). In some embodiments, the signup process is accomplished through minimal user action. Additionally, the signup module provides "at a glance" viewing of those signed up for any particular event or SubEvent, thus assisting in scheduling, eliminating duplicate signups, etc.

In some embodiments, a user operating a user device 108 may also be presented with a "General" option provides general event information such as event date, time, etc. It should be noted that, in this embodiment, the degree of user entitlement establishes the permissible view. That is, only properly authorized users will be able to view these screens. When an event or subevent is created, information is provided defining those individual users (or groups or classes of users) who are associated with the particular event or subevent. Other information may also be provided. Locations provides the location or locations of the event, as events may occur in more than one location. Administration provides various management utilities, including data logging and security utilities.

In some embodiments, each of the regions 220, 240, 260 of a user's home page are user configurable as desired, including but not limited to size, appearance, etc.

In some embodiments, a further region may also be provided, allowing authorized users to create an event and/or a meeting. Meetings, as a particular type of event, may also be offered to certain qualified external users, who are usually prequalifed or targeted.

Each user may configure their Home Page as desired, for example, by expanding or contracting different regions 220, 240, 260, their contents, etc. Generally, the view shown by the "All" tab is the default view. Alternative predetermined views are also available as defaults by user or another specified configuration (e.g., using the preferences or filters 11-14 as depicted in FIG. 2). For example, through the use of filters, an internal user may be provided with the ability to modify the default views and/or create new views. In other embodiments, the predetermined default views may differ Referring again to FIG. 2, both Home Page 10 as well as any default views such as the views defined by filters 11-14, link the user's browser to information about events. In the configuration depicted in FIG. 2, events are represented by items 15-18. These particular events 15-18 are generated by the Add Event Module 30 and/or the Edit Event Module 40, which may be available from the user's Home Page 10. The events created using the embodiment depicted in FIG. 2 are stored in a local or server side Event Storage Database b and disseminated to appropriate user's Home Page(s). The users' Home Page(s) are preferably constructed in HTML or other similar languages as known in the art, for viewing through a Web Browser. Of course, other methods of construction may be used as well.

Events are disseminated to user's Home Page through mechanisms known in the art, such as, for example, using XML transfers from the Event Storage Database. In some embodiments, not all events stored in the database are available to all users. Generally, events are made available only to authorized users, as will be explained further below.

Also seen in FIG. 2 are a Build and/or View Itinerary Module 50 and a Reporting Module 60, which will be further described below.

FIG. 2 also shows an External User Messaging Module 70 and an External User Interface 71, which may be a Web Page, Email program, etc. The External User Messaging Module 70 is shown linked to Event Storage Database b in this embodiment.

In some embodiments, external users (e.g., users operating user devices 110) receive information about events of interest through internal users (e.g., users operating user devices 108 of FIG. 1). The internal users will, as they view various events, have an ability to notify external users of a particular event, sign up external users for an event, etc. In some embodiments, an internal user communicates through email with external users. Of course, in other embodiments, other methods of communication known in the art may be used rather than or in addition to email, such as through an institutional portal, Instant Messaging, etc. In some embodiments, portal alerts will be used.

These communications between internal and external users may be, at the option of each user, sent on a regular schedule, or as desired. For example, an internal user may review events as the events are generated, and then selectively notify external users of particular events. Alternatively, communications may be sent at predetermined times, sent in groups, etc. In some embodiments, internal users communicate with external users through "Alerts", which are used as targeted communications.

It should also be noted that multiscreen and/or multiwindow interfaces are possible. For example a user may have more than one view present on a display screen at any one time. Additionally, interfaces to other calendaring applications may be provided. For example an existing enterprise-wide legacy calendar application may be present, and so some embodiments provide a link to view that legacy application through a button, tab or other means. a8

In some embodiments, information such as information identifying events, user preferences and any other referential data are stored in a central Event Storage database (shown as item b in FIG. 2, and as item 104 of FIG. 1) accessible by calendar server 102. A Web server or servers provide access to the data via each users interface. In other embodiments, depending upon scalability, duplicate databases, located on local servers, may provide data read access to local clients. If duplicate databases are used, data updates, system upgrades, modifications, etc. takes place by methods known in the art, as for example, by way of Sybase Replication if a Sybase database is used, through a replication server.

Figure 4D:
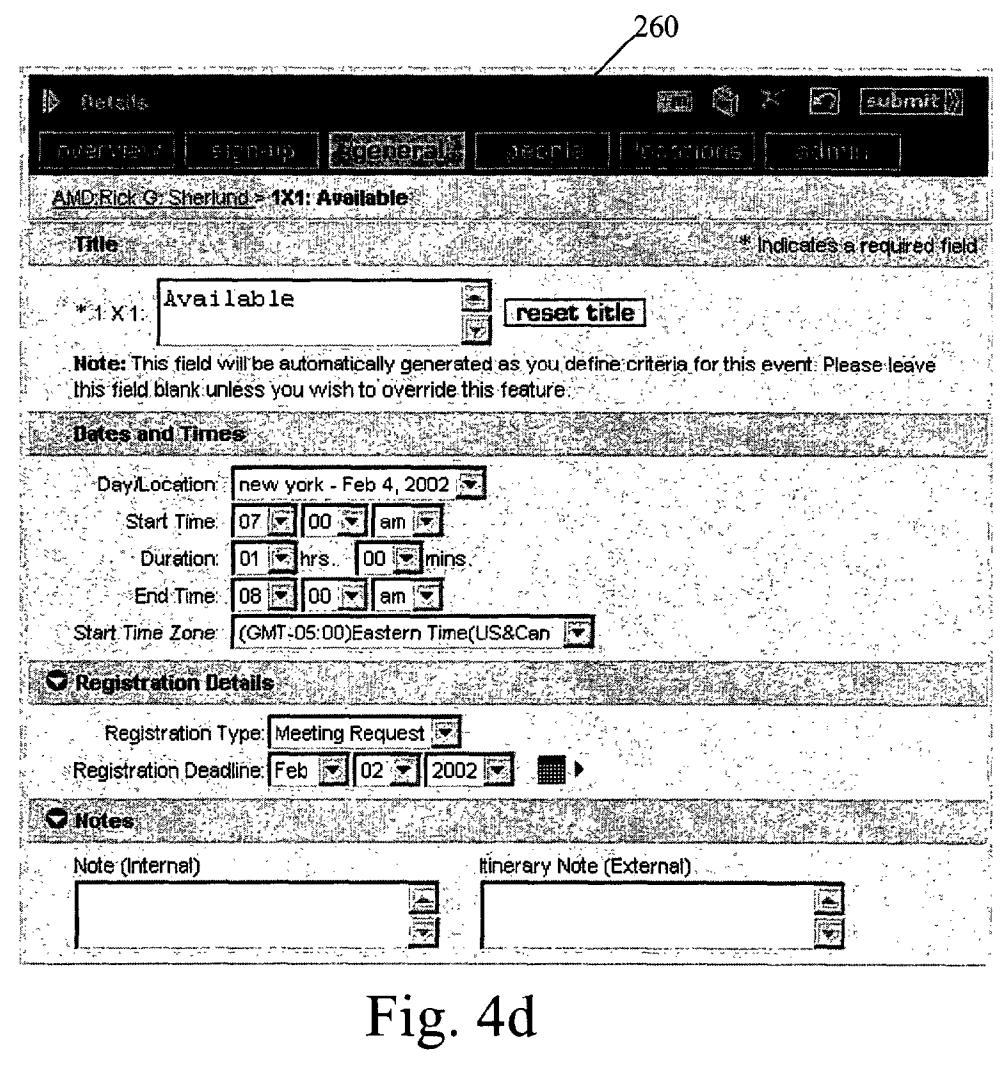

In some embodiments, some users are presented with an ability to create new events. For example, user interface 200 may include a "Create Event" option which, when selected, provides the user with an Event Creation option, which provides the user with fill in screens to provide information identifying the Event. The fill in screens standardize data entry. FIG. 4d shows an example of the General screen, which requests various event particulars. Other tabs reference other screens, including the People tab, which provides assignment of people to the Event, as well as Team creation and assignment (a Team is a group of People that are related to the Event), the Location tab, which provides location assignment(s) for the Event (the Event may have more than one location); and the Administration tab, which provides Tagging and Security utilities. The Overview And Signup tabs are used once the Event has been placed on the Calendar. The Overview tab allows users to view Event details, including presentation speakers, RSVP contacts, conference call dial in numbers, etc. The Signup tab provides the User with Signup ability for the various Events.

The user inputs the appropriate variables. The variables are Event Tags, which are used, as is described further below, for subsequent search and retrieval of the event. The user also sets access or viewing rights to the event which ensure that only authorized users can see the event.

Once completed the user stores the event on the Event Storage Database. The event is initially stored as an Event Shell. The user, or another authorized user, can then access the Event Shell to input any SubEvents (also known as Dependent Events,) such as meetings, conferences, etc., occurring during the Event.

Because Meetings are usually the most requested Dependent Event, and may as well take place independently of an Event, such as a standalone Meeting, direct Meeting scheduling is provided from the default screen shown at FIG. 4d. In some embodiments, Meetings are one of a number of predetermined types, including 1×1 (a client-presenter direct meeting,) Conference Call, Field Visit, Analyst Meeting, etc.

If the direct Meeting option is not used, Dependent Event creation may be done after first accessing the Event. The Events may be accessed in a number of ways, preferably through use of a search function, and the Event Tags. When the Event has been retrieved, a Dependent Event may be input. Returning to FIG. 7, for example, the Dependent Events for the Event may be scheduled by selecting the Create Meeting request.

A predetermined set of keywords may be used while adding additional Dependent Events. For example, the Dependent Event "1×1" or may be indicated by a specific keyword or symbol, and once the keyword is chosen further default meeting details may be filled in automatically.

Besides Event Shells and Dependent Events, the user might also input Stand Alone Events. Stand Alone Events are those not associated with an Event Shell. For example, a CEO conference call explaining quarterly earnings might be a Stand Alone Event.

Events might also be input into the system automatically. For example, Release of Corporate Earnings, Government Information, and other Corporate and Financial Events might be imported automatically through appropriate interfaces. Additionally, information from existing calendaring applications, such as Microsoft Outlook®, might also be simultaneously added to the Event Storage Database through use of appropriate interfaces.

Event creation, whether of Event Shells, Dependent Events or Stand Alone Events, might also include manually generated or automatically generated hyperlinks from the Event to documents or other information about the event, as well as registration, itinerary and response capabilities, as is described further below.

Any particular user's ability to create an Event is determined by the level of user authorization. User authorization for Event Creation is based upon the user's membership in various groups, with the various groups having different levels of Event Creation authority. For example, a user may be present in the sales group, and thus have authority only to create Sales Events, while a high level corporate officer may have authority to create any type of event.

The creation of an Event Shell, Dependent Event, or Stand Alone Event and/or the management of an event (described below) also includes the creation of user authorizations for viewing the Event. In general, in some embodiments, internal users are divided into groups such as: enterprise wide groups; division groups; department groups, etc. The groups are predetermined, although a user may create a group for any particular event.

Any particular user may view an event only if he falls within the authorized group or groups. In addition, certain authorized event-creating users may modify and/or override the authorized groupings so as to provide permission to specific users as well. The event creating user might also manually add a group or groups.

The identification of authorized viewing user groups might occur automatically during event creation. For example, an Analyst Research Marketing Day Event automatically allows a broad group of users, such as all divisional employees, to view the event listing.

Once the event is created, (and in some embodiments, reviewed by a compliance officer), it is sent to the Event Storage Database, and available for dissemination as was described above. Dissemination may also be through messaging, such as through email, instant messaging, and any other means as known in the art. Authorized users, by way of their various views, may access the event and review the details. Additionally, dissemination may be through Alerts to notify the user, and/or appropriate links to a portal maybe used as well.

An authorized user's default view is the "All" view, which allows the user to track all events that he is authorized to view. Users are able to identify events with which they are associated (e.g., Attendee, Speaker, Invitee, RSVP Contact, etc.). In certain embodiments, via User Preference Customization, the user will also be able to select events in which they are interested by variables, such as adding symbols to a watch list that allows them to track activities for selected companies. Variables include: Event Type; Location of Event (City, Country, Region, Venue); Research Analyst (Author); Product Line; Watchlist. Of course other examples and other embodiments may have additional or different variables.

Views are hyperlinked in some embodiments, and the user may move through the views as desired. Various other hyperlinks are used as well, including links to documents and other information.

In some embodiments, once Events are created, various Event Management tasks are provided. Event Management includes tasks as Registration, including scheduling dependent events, scheduling attendance, making reservations, meeting special needs of attendees, reporting on attendance at an event, etc. Event management occurs prior to, during or after an event has actually occurred.

For example, various Registration levels are established for events:

Request Meeting, allowing users to request meeting time preferences with the ability to view others' preferences. For example, if a client has 9:00 meeting times as a preference, other clients may not be able to obtain meetings at that time, and so would select another slot as their first choice.

Open Sign Up, allowing registration on a 'first come first serve' basis.

Closed, for meetings that are not open to the public. Time slot assignment is determined by the event and/or meeting creator.

Generally, modifications, additions, etc. to the event and deletions of an event are possible through Event Management. Event Management is controlled by user authorization. Some Event Management users may, for example, be unable to view or modify certain events. For example, if an event is "Closed" or limited to certain authorized users, then only a limited group may manage the event.

Event Management includes management of available time slots for the event. For example, an all day marketing event may include various dependent events, such as meetings with clients, which need to be scheduled during the event. Conflicts may arise scheduling those meetings. For example, one or more clients may, after receiving notice of the event (as will be described below) request the same time slots, leading to conflict. In order to resolve the conflict, the meeting times are assigned automatically or manually, with certain clients receiving preference for preferred times, if desired.

Event Management also includes attendance confirmation. Attendance confirmation is primarily the responsibility of an event coordinator. The event coordinator might, for example, need to Request Meeting (allowing the event management user to book and/or confirm final timeslots for clients;) access Open Sign Up (allowing users to log and/or confirm attendance before or after an event has occurred;) etc. Some embodiments use Alerts for confirming client requests for Events, as well as notification to clients of events of interest and confirmation of signup requests.

Modifications to Events are disseminated through alerts that have three levels: Internal User Notification only, Internal User Notification with Client Forwarding, and Direct Client Notification. Other methods may of course be used.

As was described above, Notification to Clients of forthcoming Events, as well as Registration information for Events may be disseminated through email. One or more Distribution List(s) which may be enterprise wide, personal to the User, Selectable by Client Interest, etc. are used to disseminate these notifications in order to simplify the notification process.

Referring again to FIG. 2, the Build and/or View Itinerary Module 50 and the Reporting Module 60 are seen as well. The Itinerary Module permits users to build and view an itinerary customized to their needs (e.g., for a particular client) Itinerary information may include travel details, event status, event location(s), etc.

The Reporting Module provides the User with the ability to generate standardized and customized reports. Examples of reports are:

Attendance Report. Shows the status of meeting attendance. Links to client databases, in certain embodiments, provides pre-population of known clients. Information such as client status (e.g., invited, accepted, declined, cancelled, attended, walk-in, no-show) may also be included. Post event information includes notes capabilities for special client information (e.g., would like to be informed, next opportunity event occurs; canceled 5 minutes before event). Historical reports can also be generated to obtain historical information regarding client activities, attendance, provide usage and service tracking, etc.

The description of the embodiments herein uses Web terminology. However, it should be specifically understood that embodiments can be implemented in environments that support GUI and other interfaces, including but not limited to Microsoft Windows® NT, Windows® 2000, Windows® 95, 98 and Me, Unix® and Unix®-like platforms, including but not limited to Linux® and its variants, as well as other operating system platforms including but not limited to IBM OS/390, MacOS, VxWorks® and others.

It should also be noted that other embodiments may publish to other types of interfaces, both on the Web or other interfaces, including email, Alerts, Instant Messaging, etc. as well as to devices including personal computers, terminals, personal digital assistants, cell phones, digital appliances, etc.

In one embodiment, the calendaring system may interface with existing calendaring software, allowing the integration of calendar data generated and manipulated by calendaring system 100 (e.g., such as event data stored in calendar database 104 of FIG. 1) with calendar data stored by other calendaring software. For example, in one embodiment calendaring system 100 integrates with Microsoft Outlook®, allowing individual users (including internal users operating user devices 108 and external users operating user devices 110) to synchronize their Outlooks calendar with data from calendaring system 100. In some embodiments, this reduces the need for a user to re-key information from calendaring system 100 into their Outlooks calendar (those skilled in the art will appreciate that other calendaring systems may also be integrated into calendaring system 100). For simplicity, the external calendaring system (which may be Outlook® or some other system), will be referred to as the external calendaring system.

Reference is now made to FIG. 4e, where a detail user interface 260 is shown (which, e.g., may be presented in region 260 of user interface 220 on display device 200 of FIG. 3). Detail user interface 260 presents details regarding a particular meeting or subevent to a user. In the depicted example, the subevent is a teleconference with a Security Access level making it available to all company employees (or "internal users"). Several "external users" are also invited.

Figure 4F:
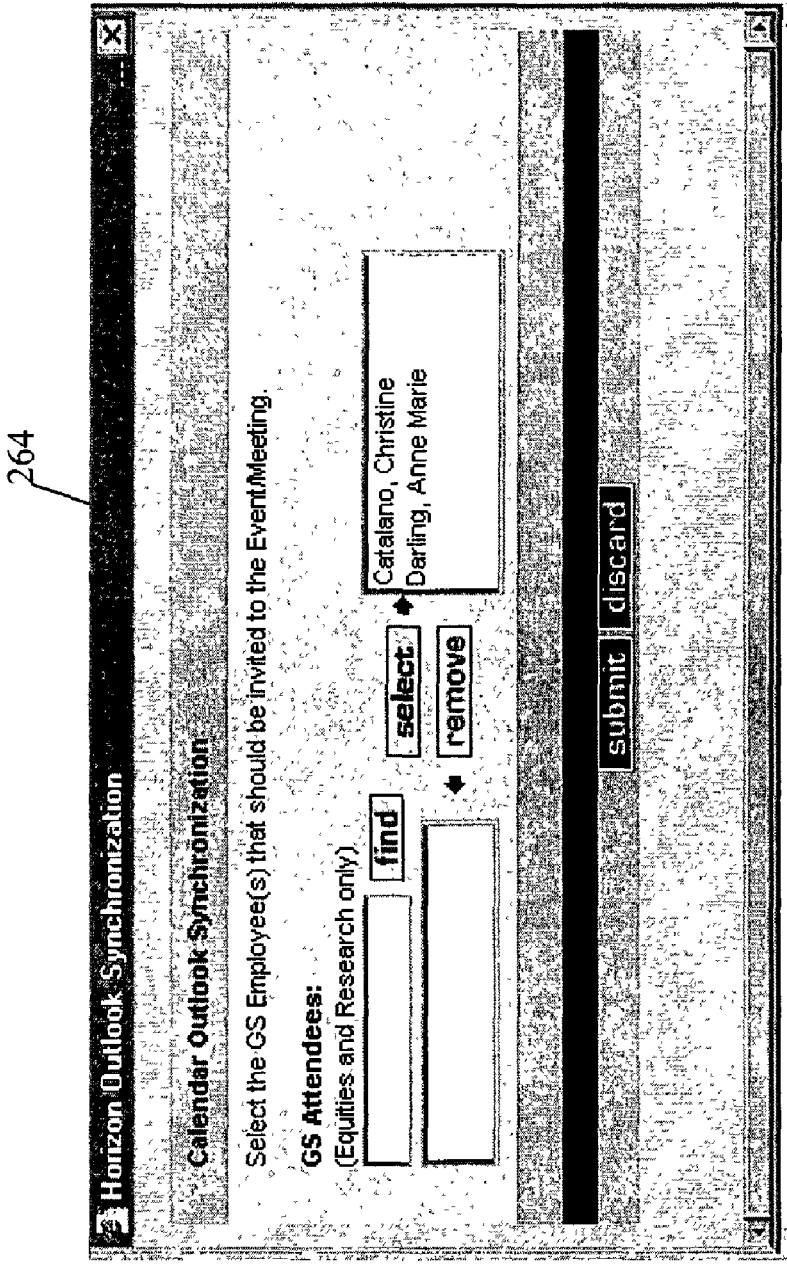

Detail user interface 260 also includes a synchronize icon 262. Synchronize icon 262 allows a user interacting with detail user interface 260 to synchronize details of the selected Event with either her own calendar (maintained by external calendaring system such as Outlook®) or the calendar of one or more other users. In some embodiments, selecting synchroize icon 262 will cause a dialog box 264 (shown in FIG. 4f) to appear, providing several options, including the ability to select one or more internal users whose external calendars are to be updated with the Event depicted in detail user interface 260. In some embodiments, an ability to search for internal users may also be provided.

Figure 4G:
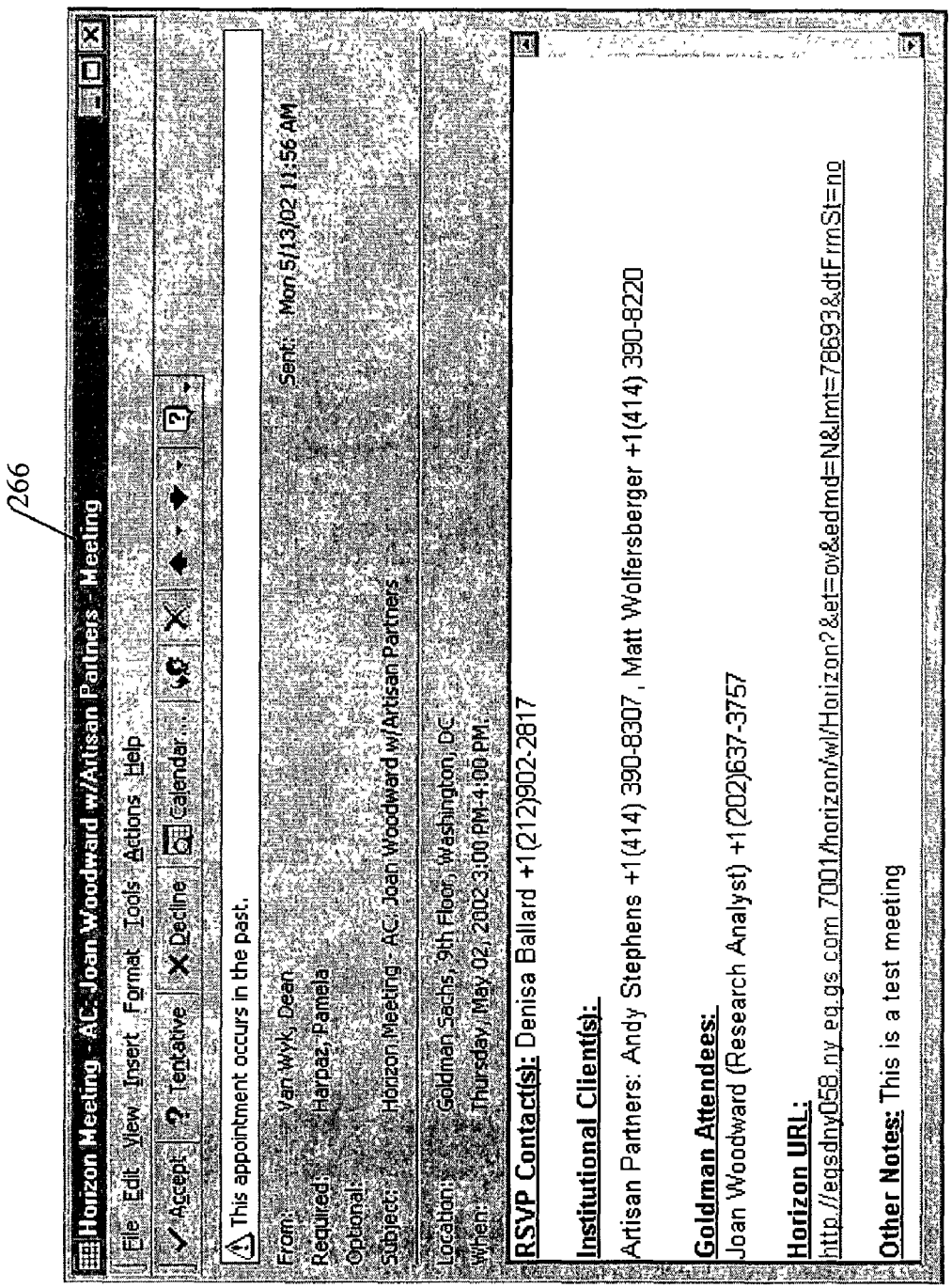

The external calendars of each of these users will be updated with details regarding the Event depicted in detail user interface 260 by selecting the "Submit" icon. In some embodiments, by selecting the "Submit" icon, a meeting invitation request 266 (depicted in FIG. 4g) may be generated. The meeting invitation request 266 may be generated having details regarding the Event, including the Event time, location, attendees, and subject. Upon receipt of the meeting invitation request 266, each of the invited users may accept, decline, or otherwise respond to the request. In this manner, Event information stored, maintained, and updated by calendaring system 100 may be easily communicated to individual users and synchronized with their primary calendaring software. Further, by utilizing meeting invitation and calendaring functions of existing calendar software, embodiments reduce the need for time to be spent by administrators to manage Event scheduling and sign-up, and provide a comfortable and familiar user interface for Event attendees and other users.

Figure 4H:
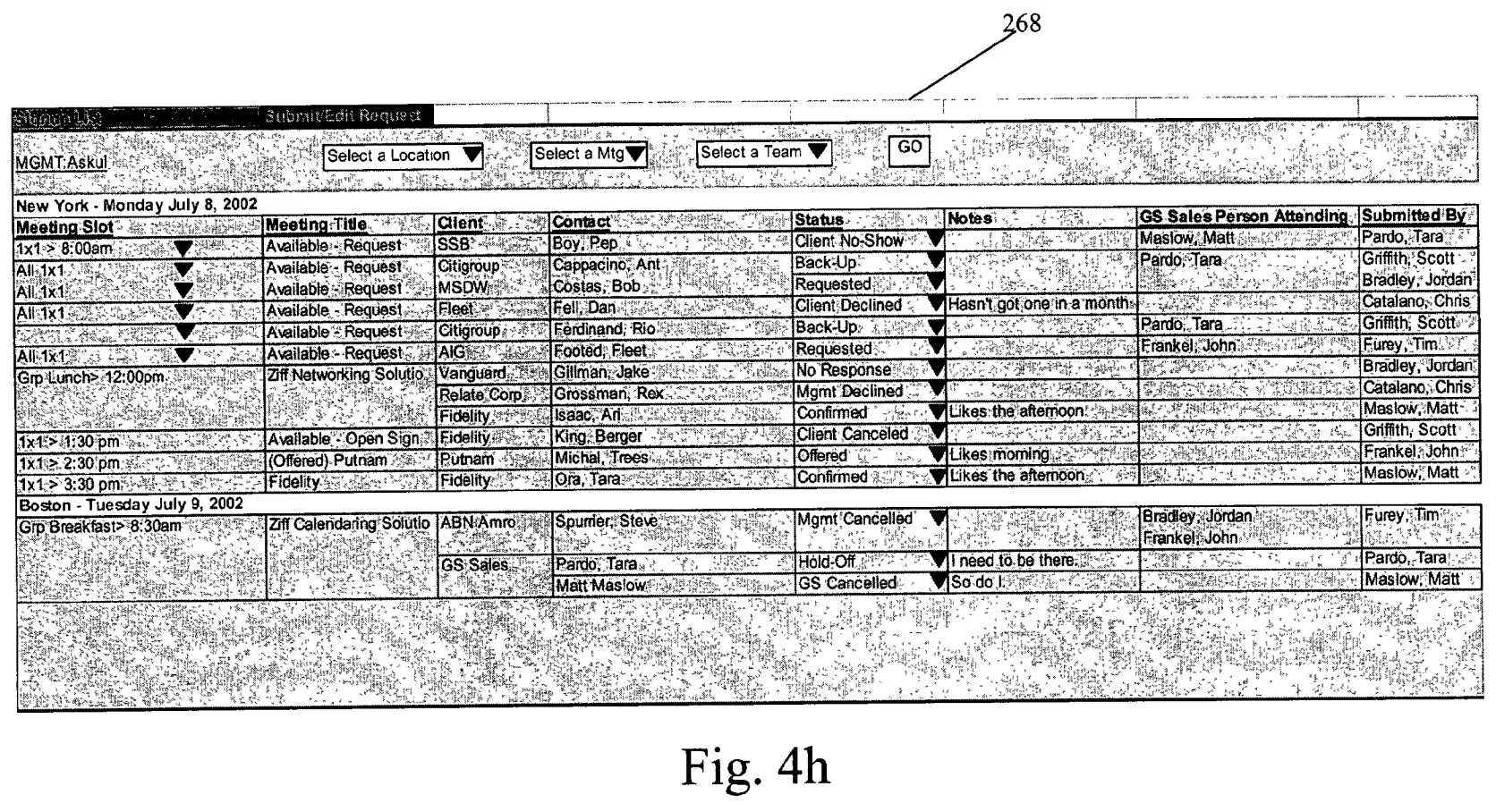

Embodiments provide other tools to faciliate Event sign up and management. For example, referring to FIG. 4h, an detailed event sign up interface 268 is depicted which may be viewed by a user having appropriate privileges. For example, a user who is a salesperson and who must manage many invitations to external users to many different Events may interact with detailed event sign up interface 268 to view Events of potential interest. In the example depicted in FIG. 4h, a salesperson has selected to view all Events which are available in New York on a particular date. The user could also select different views (e.g., by particular meetings or meeting types, by teams, etc.).

Top-level details of each meeting (e.g., including a meeting title, a client, a contact, a status, etc.) are presented in interface 268. The salesperson may elect to view more details of particular Events by selecting one of the rows of the table. Further, the salesperson may view their Event requests and modify information in those requests with few keystrokes. In this manner, interaction, viewing, and manipulation of information regarding large numbers of meetings may be simplified. Further synchronization may be provided to synchronize event information with other systems and devices, providing further convenience to users.

Figure 6:
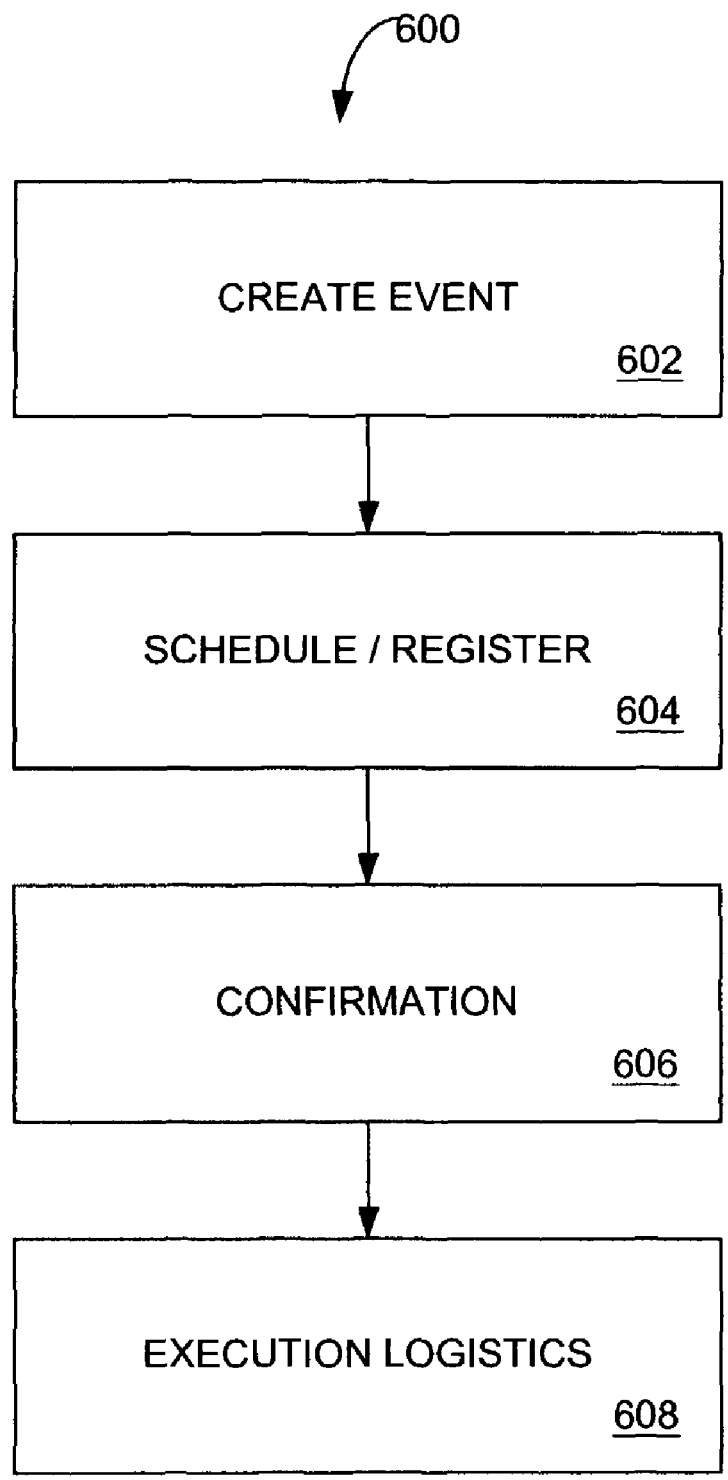
FIG. 6 shows a calendar process which may be performed using the system of FIG. 1.

Reference is now made to FIG. 6, where a calendar process 600 is depicted which represents activities taken to create a particular type of Event in calendaring system 100. Calendar process 600 may be implemented in software operated under the control of calendar server 102 operating in conjunction with one or more user devices 108, 110. In general, calendar process 600 includes Event creation 602, scheduling and registration 604, confirmation 606 and execution logistics 608. These process steps may occur at a number of different times and may involve a number of different users operating user devices 108, 110. Features of embodiments provide an ability to efficiently manage and coordinate calendar process 600 even where a large number of Events and users are involved. Calendar process 600 may be used to create, schedule, manage, and execute Events such as, for example large meetings, conferences, road shows, or other events.

Event creation 602 may commence, for example, when an internal user operating user device 108 and interacting with calendar server 102 elects to create an event. The internal user may be, for example, a user having sufficient privileges and authority to create an event (e.g., such as a meeting coordinator or the like). In some embodiments, the user may delegate certain permissions and authority to subsidiary users to assist in creating and managing a particular event. The user (or her delegates) may then create event schedule and information. For example, if the event is an event requiring venue, hotel, travel, or other registration, these may be performed by the user by interacting with calendar server 102. The user may send an internal Event notification to all members of a particular target group (e.g., all "Sales People" may receive a notification). In some embodiments, this notification may be sent using Microsoft Outlook® or other program. In some embodiments, an electronic mail message including event details may be sent to a particular target group for them to forward on to external users (e.g., such as their clients who should be invited to the event). As described above, various filtering may be utilized to screen recipients of invitations and to prevent unauthorized users from viewing Event information.

Processing continues at 604 where calendaring server 102 functions to facilitate scheduling and registration for the event created at 602. In some embodiments, the group of users who received Event notifications (e.g., particular Sales People) utilize information from the Event notification to invite particular external users to the Event (e.g., by forwarding emails, telephoning, faxing, etc.). In some embodiments, the internal users (such as the Sales People) may enter time slot information in the Event for their invited external users. In some embodiments, calendering server 102 may function to assist in the allocation of time slots and other resources. This process repeats until all time slots are full, until the Event occurs, or until all interested external users have been scheduled. Users may then view a finalized schedule and/or edit the schedule.

Processing continues at 606 where calendaring server 102 functions to manage and faciliate confirmation of users who are scheduled to participate in Events. In some embodiments, processing at 606 may include building finalized itineraries and generate confirmation information to be transmitted to attendees. In some embodiments, customized reminder information may be transmitted to participants at scheduled times (e.g., 1 day prior, 1 hour prior, etc.). In some embodiments, name tags and other participant information may also be generated using calendaring server 102.

Processing continues at 608 where calendaring server 102 functions to facilitate Event execution. For example, users may interact wth calendaring server 102 to cancel an Event and to cause email notifications to be delivered to all registered attendees. Further, users may interact with calendaring server 102 to log final attendance information, including no shows, late cancellations, walkins, etc. Attendance reports and other summary information may also be generated. Further, information about attendees may be utilized to update user information stored in calendar data 104. In this manner, embodiments may be utilized to create, manage, and communicate regarding Events, even where the Events involve large numbers of participants having different schedules and requirements.

The above description and the views and material depicted by the figures are for purposes of illustration only and are not intended to be, and should not be construed as, limitations on the invention.

Moreover, certain modifications or alternatives may suggest themselves to those skilled in the art upon reading of this specification, all of which are intended to be within the spirit and scope of the present invention as defined in the attached claims.

I claim:

1. A processor-implemented method for creating an event, the method comprising:
   periodically querying a plurality of internal and external data sources to import event data from at least one of the plurality of internal and external data sources;
   receiving an event search request;
   processing the received event search request to determine a plurality of first interest filters associated with the received event search request;
   filtering, by a processor, the imported event data based on the determined plurality of first interest filters to establish a plurality of available event types;
   receiving a selection of an event type from among the established plurality of available event types;
   associating by the processor a plurality of subevent types with said selected event type, said subevent types selected from a plurality of available subevent types, said subevent types including at least one conference call and at least one one-on-one meeting;
   providing by the processor event and subevent details for said selected event type and said selected subevent types; and
   establishing by the processor internal access privileges for said selected event type, wherein said internal access privileges are automatically associated with each of said selected subevent types and a group of internal users.

2. The method of claim 1, wherein said receiving a selection of an event type from among the established plurality of available event types includes receiving the selection from a user device operated to interact with a graphical user interface, said graphical user interface including:
   a Search Region,
   a View Region,
   a Details Region, which further comprises
      a Sign Up option,
      a General option,
      a People option, and,
      a Location option,
   wherein each of said regions is user configurable.

3. The method of claim 2, wherein said graphical user interface further includes at least a create event option and a create meeting option, each allowing entry of said event and subevent details, respectively.

4. The method of claim 2 wherein said graphical user interface further comprises a filter option.

5. The method of claim 4 further comprising selecting said filter option and choosing a filter and subsequently viewing said interface through said filter.

6. The method of claim 5 wherein said filter option is chosen from the group comprising: My Events, My Contacts, Deal, Non-Deal, Analyst Marketing, Conferences, Conference Calls, Corporate Actions, Economic, Street Wide, or All.

7. The method of claim 3, wherein the create event option further comprises a Create Event Shell, Dependant Event or Stand Alone Event option.

8. The method of claim 1, further comprising presenting a registration interface to users having said access privileges.

9. The method of claim 8, wherein said registration interface includes registration details identifying if an event is available for registration.

10. The method of claim 8, wherein said registration interface includes registration details identifying if an event is available for open sign up.

11. The method of claim 8, wherein said registration interface includes information allowing a user to register for an event and one or more subevents associated with said event.

12. The method of claim 1, further comprising defining a plurality of internal user groupings each associated with the selected event type and at least one of the plurality of subevent types.

13. The method of claim 1, wherein each first interest filter is associated with one of a plurality of second interest filters.

14. The method of claim 1, wherein the event and subevent details are predetermined.

15. The method of claim 14, wherein the predetermined event and subevent details are derived from the plurality of first interest filters and a plurality of second interest filters.

16. An apparatus for generating a single source calendaring interface for scheduling events, in a client side data processing system, said apparatus comprising:
at least one of a plurality of internal and external data sources from a server side data processing system, wherein a plurality of event data feeds are constructed from said internal and external data sources based on different internal user access privileges and event search request data including first interest filter data and established available event types derived from the first interest filter data, a graphic user interface constructed from said plurality of feeds, wherein said graphic user interface further comprises:
a Search Region;
a View Region, said View Region allowing a user to view each event either in collapsed form or in expanded form, said expanded form allowing the user to view all sub-events included in said each event;
a Details Region, which further comprises:
a Sign Up option;
a General option;
a People option; and
a Location option;
a Registration option, wherein the Registration option is established for each event;
and whereby each of the Regions is User configurable.

17. An apparatus as in claim 16, wherein said interface further comprises a Web page.

18. An apparatus as in claim 16, further comprising:
a Create Event option.

19. An apparatus as in claim 16, whereby said interface further comprises:
a Create Meeting option.

20. An apparatus as in claim 16, wherein said interface option further comprises a filter option.

21. An apparatus as in claim 16, wherein said filter option further comprises choosing a filter and subsequently viewing said interface by means of said filter.

22. An apparatus as in claim 16, wherein said filter option is chosen from the group comprising: My Events, My Contacts, Deal, Non-Deal, Analyst Marketing, Conferences, Conference Calls, Corporate Actions, Economic, Street Wide, or All.

23. An apparatus as in claim 16, wherein the Create Event option further comprises a Create Event Shell option, Dependant Event option or Stand Alone Event option.

24. An apparatus as in claim 16, wherein said Registration option further comprises a Request Meeting option, Open Sign Up option, or Closed option.

25. An apparatus as in claim 16, wherein any Registrations are maintained within at least one of said data sources.

26. An apparatus as in claim 25, wherein any Registrations are disseminated.

27. An apparatus as in claim 26, wherein any dissemination of said Registrations is via said interface.

28. A method for managing an event, comprising:
operating a user device to periodically query a plurality of internal and external data sources to import event data from at least one of the plurality of internal and external data sources, and select an event based on an event search request and available event type data derived from filtering the imported event data by determined first interest filters, said event suitable for a plurality of external users, said event including event information defining a time, a location, and a subject, said event including a plurality of subevents, said plurality of subevents including at least one conference call and at least one one-on-one meeting;
causing event information to be transmitted to a first group of internal users for communication to said plurality of external users, each internal user having differentiated access privileges;
receiving requests for attendance from said plurality of external users;
creating a final event schedule based on the received said requests for attendance;
causing confirmation information to be transmitted to said first group of internal users for communication to said plurality of external users; and
upon completion of said event:
generating event summary reports, wherein the event summary reports comprise information relating to attendees of said event; and
causing information relating to said external users to be updated using said information relating to attendees of said event.

29. The method of claim 28, wherein said causing event information to be transmitted includes generating an electronic mail message using an electronic mail service.

* * * * *